United States Patent Office
3,741,907
Patented June 26, 1973

3,741,907
FLUORESCENT PIGMENTS HAVING AN ISOCYANATE RESIN BASE
Hans-Peter Beyerlin, Stuttgart-Weilimdorf, Germany, assignor to G. Giegle & Co. GmbH, Stuttgart, Germany
No Drawing. Filed Mar. 16, 1971, Ser. No. 124,963
Claims priority, application Germany, Mar. 20, 1970,
P 20 13 393.1; Dec. 28, 1970, P 20 63 948.9
Int. Cl. C09k 1/00, 1/02
U.S. Cl. 252—301.2 R                    5 Claims

ABSTRACT OF THE DISCLOSURE

Brittle resins suitable as bases for fluorescent pigments are prepared from diisocyanates by polyaddition reactions with sulfonamides and/or polyols. The coloring matter may be dispersed in the polymerization mixture or the comminuted resins may be dyed in an acid dye bath. The resins are readily pulverized, resist elevated temperatures without softening or decomposing, and are insoluble or practically insoluble in the solvents usually employed in making organic coating compositions and inks.

---

This invention relates to fluorescent pigments. More specifically, this invention is concerned with pigments essentially consisting of an organic polymer or resin and fluorescent coloring matter uniformly dispersed in the polymer or resin.

It is known to disperse fluorescent coloring matter, such as organic dyes, in resins, and to comminute the colored resin so as to produce fluorescent pigments. The resins proposed heretofore as pigment bases include polyesters, homopolymers and copolymers of vinyl acetate and vinyl chloride, urea formaldehyde resins, and melamine formaldehyde resins. The only resins employed recently on a substantial commercial scale are products of the polycondensation of formaldehyde with aromatic sulfonamides with or without heterocyclic amines, such as di- and triamino-s-triazines.

The commercially used fluorescent pigments have softening temperatures not usually exceeding 115° C. and are partly decomposed with the release of formaldehyde when heated to temperatures above 120° C. They are soluble in a relatively large number of organic solvents. Because of these properties they are limited in their applications.

The primary object of this invention is the provision of resin-based fluorescent pigments which are free from the shortcomings of the known materials. More specifically, the invention aims at providing pigments which are more heat resistant than those now employed in having generally higher softening points and not releasing noxious formaldehyde regardless of the temperature to which they are exposed. Another important object is the provision of such pigments which are insoluble or practically insoluble in a wider range of organic solvents than the known pigments.

Suitable bases for such pigments have been found in a group of isocyanate resins prepared by the polyaddition reaction of organic diisocyanates of any kind with sulfonamides, and of aliphatic or cycloaliphatic diisocyanates with polyols, the latter term being employed in this specification and the appended claims to embrace dihydric alcohols.

Both types of isocyanate resins may be further modified by minor amounts of heterocyclic di- or polyamines, urea, thiourea, diamides of dicarboxylic acids, amides of organic sulfonic acids and N-monosubstitution products of such diamides and amides, biuret, dicyanodiamide, and the like present in the polymerization mixture while the same is being held under polyaddition reaction conditions.

The pigments prepared from the resins of the invention have softening temperatures which may approach 300° C., and they cannot release formaldehyde by thermal decomposition. The pigments of the invention based on sulfonamides have generally better light and weather resistance than known fluorescent pigments.

It is a common property of the resins of the invention that they can be comminuted very easily because of their brittleness so that fluorescent powders having a very small particle size can easily be prepared. The powders, because of the particle size, form stable dispersions in the vehicles of lacquers, inks, and the like, and in many plastics. The relative friability of the resins is thought to be due to a reaction of isocyanate groups with unavoidable trace amounts of water. The reaction causes the release of gaseous carbon dioxide which forms small voids or pores in the resins of the invention.

The modifying agents mentioned above enhance the hardness, brittleness, and temperature resistance of the resins and contribute to their lack of solubility in organic solvents.

The resins are practically colorless and do not fluorescence in daylight. They may be dyed with fluorescent dyes while finely comminuted, or coloring matter may be dispersed in the polymerization mixture prior to or during formation of the resins. If so desired, the coloring matter may include not only fluorescent dyes, but also non-fluorescent dyes or pigments and optical brighteners, that is fluorescent materials not materially affecting the color in which the pigment fluoresces.

The amount of coloring matter is chosen to produce the desired result and may vary widely depending on the nature of the resin base among other variables. The maximum limit of useful coloring matter is set by the decrease and ultimate disappearance of fluorescence at a high concentration of coloring matter in the resin base, as is known.

The polyaddition reaction is not affected by the presence of the usual fluorescent dyes in practical amounts. It is carried out at temperatures between 100° and 250° C. Resins partly based on sulfonamides are preferably formed at temperatures between 150° and 250° C., while temperatures above 200° C. are normally avoided where polyols are the primary reaction partners of the diisocyanates, and a temperature of 100° to 150° C. is preferred. The polyaddition reaction is exothermic, and the temperature of the reaction mixture rises spontaneously after an induction period of normally a few minutes.

The initial ratio of the principal reactants may be varied within relatively wide limits, but the number of available NCO groups should be at least 50% of the combined number of all available NH and OH groups in the other reaction partners, and may exceed the combined number. An excess of about 10% NCO over all NH and alcoholic OH groups is not accompanied by a loss in the desirable properties of the resin.

All organic diisocyanates that have been tested are useful in preparing resins at least with the sulfonamides, but the number of diisocyanates now available in commercial quantities at reasonable cost is limited. Good results have been obtained with such aromatic diisocyanates as phenylene-1,4-diisocyanate, 2,4- and 2,6-tolylene diisocyanates and their technical mixtures, naphthylene-1,5-diisocyanate, 3,3'-bitolylene-4,4'-diisocyanate, diphenylmethane-4,4'-diisocyanate, 3,3'-dimethyldiphenylmethane - 4,4'-diisocyanate, metaphenylene diisocyanate, 2,4-tolylene diisocyanate dimer, dianisidine diisocyanate, triphenylmethane triisocyanate and a commercial mixture sold as "polyaryl polyisocyanate (tri)." Preferred cycloaliphatic diisocyanates include 3-isocyanatomethyl-3,5,5-trimethylcyclohexyl isocyanate and 4,4'-diisocyanato-dicyclohexylmethane. Suitable aliphatic diisocyanates include hexamethylene diisocyanate and trimethylhexamethylene diisocyanate. Aliphatic diisocyanates, such as α-3-isocyanatophenylethyl isocyanate also have been converted to pigment bases according to this invention.

The range of available organic sulfonamides is as wide as that of the diisocyanates. They may be amides of aryl-, alkyl-, and aralkylsulfonic acids. The most conveniently available aromatic sulfonamides are benzenesulfonamide, p- and o-toluenesulfonamide and their technical mixtures, but naphthalene-1-sulfonamide, naphthalene-2-sulfonamide, m-nitrobenzenesulfonamide, p-chlorobenzenesulfonamide, and sulfanilide are equally effective. Methanesulfonamide and its higher homologs, and phenylmethanesulfonamide and its homologs have been used successfully. The reaction is not limited to sulfonamides having a single $SO_2NH_2$ group, and benzene-1,3-disulfonamide and naphthalene-1,5-disulfonamide are fully effective.

The polyols which may be reacted with aliphatic or cycloaliphatic diisocyanates to form resin bases according to this invention may have aliphatic carbon chains carrying two or more hydroxyl groups, particularly compounds of the formula

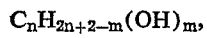

$$C_nH_{2n+2-m}(OH)_m,$$

wherein $n$ is an integer between 2 and 8, and $m$ is an integer between 2 and 4. Other suitable polyols may contain cycloaliphatic, aromatic-aliphatic carbon skeletons, and carbon chains interrupted by oxygen in ether linkages, as in di-ω-hydroxy-lower-alkoxy-benzene. Such other polyols further include derivatives of Bisphenol and of its hydrogenation products which are alcohols of the formula

HO—X—Y—X—OH wherein X is lower alkylene-phenylene or cyclohexane. The alkylene may be ethylene or hexamethylene or any intermediate homolog. Y is lower alkylidene.

The preferred modifying agents which may be present in the reaction mixture during the polyaddition reaction and are chemically bonded to the principal reactants by the reaction are derivatives of s-triazine having at least two NH groups attached to the triazine ring. They include diamino-s-triazine and its substitution products of the formula

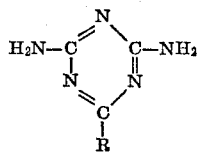

wherein R may be hydrogen, amino, alkyl (methyl, ethyl, propyl, nonyl), aryl (phenyl), aralkyl (benzyl), alkoxy (butoxy), alkanoyl (n-decanoyl), aryloxy (phenoxy), or halogen (chlorine).

Similarly effective, but less readily available, are the diamino derivatives of pyrimidine, hydantoine, guanazole, imidazole, and the like. Cyanuric acid also is effective although it lacks amino groups attached to a ring.

Non-cyclic amines or amides suitable for enhancing the hardness and temperature resistance of the fluorescent pigments ultimately produced include urea, N-monosubstitution products of urea and of sulfamide, thiourea, biuret, dicyanodiamide, sulfonamides of the types described above and their N-monosubstituted derivatives, and the diamides of such dicarboxylic acids as malonic, succinic, adipic, and glutaric acid, and their N-monosubstitution products.

If so desired, the polymerization mixture may contain more than one diisocyanate, sulfonamide, polyol, and modifying agent as will be partly shown hereinbelow.

The nature of the fluorescent coloring matter is not critical. Many fluorescent dyes are commercially available and may be employed for dyeing the comminuted resin or be incorporated in the resin by being added to the polymerization mixture. When Rhodamine B is employed, the fluorescence of the pigment is somewhat bluish, a hue not available from this dye when dispersed in known carrier resins.

The following examples are further illustrative of this invention. The abbreviation "s.p." in these examples stands for "softening point."

EXAMPLE 1

A clear melt was prepared from 17.1 g. p-toluenesulfonamide and 21.0 g. trimethyl-hexamethylenediisocyanate by mixing at 150° to 160° C., and 0.3 g. Rhodamine B (Colour Index No. 45170) was dissolved in the monomer mixture. An exothermic reaction started in the mixture after about 5 to 10 minutes, and the initial temperature was maintained for two hours when the spontaneous reaction started subsiding.

The entire reaction product was then permitted to cool and to solidify. A brittle resin fluorescing in a bluish red color was obtained, and was readily ground to a fine powder (s.p. 100° C.).

A similar product was obtained within one hour when the trimethyl-hexamethylenediisocyanate was replaced by 22.2 g. 3-isocyanatomethyl-3,5,5-trimethylcyclohexyl isocyanate (s.p. 95° C.).

EXAMPLE 2

10.3 g. p-toluenesulfonamide and 0.2 g. Rhodamine B were dissolved at 120°–130° C. in 12.6 g. trimethyl-hexamethylene-diisocyanate. After about 5 to 10 minutes, a reaction started which caused the temperature to rise somewhat beyond 160° C. The temperature thereafter was kept at 150° to 160° C. while 1.3 g. melamine was added with stirring in small batches. Thereafter, additional trimethyl-hexamethylenediisocyanate was stirred into the melt in an amount of 3.2 g. The temperature then was raised to 180°–190° C. for one hour.

Upon cooling and solidification, a bluish red resin was obtained and was readily ground to a fine powder (s.p. 140° C.).

EXAMPLE 3

8.6 g. p-toluenesulfonamide, 2.5 g. melamnie, 17.8 g. 3-isocyanatomethyl-3,5,5-trimethylcyclohexyl isocyanate, and 0.23 g. Rhodamine B were intimately mixed at 150° to 160° C. An exothermic reaction started in the homogeneous melt so obtained within 5 to 8 minutes and brought the temperature of the mixture to 200° C. When the reaction started subsiding, a temperature of 180° to 190° C. was maintained for one hour by heating.

The bluish red fluorescent resin obtained upon cooling and solidification was brittle enough to be readily comminuted (s.p. 170° C.).

EXAMPLE 4

A homogeneous melt was obtained as in Example 3 from 8.6 g. p-toluenesulfonamide, 5.6 g. 2,4-diamino-6-phenyl-s-triazine, 16.8 g. trimethyl-hexamethylene diisocyanate, and 1.2 g. Brilliant Yellow 6 G (C.I. 56200) at an initial temperature of 150°–160° C. After the reaction started, a temperature of 170°–180° C. was maintained for one hour.

Upon cooling and solidification, there was obtained a brittle resin which fluoresced yellow and was easily ground to a powder (s.p. 155° C.).

EXAMPLE 5

A homogeneous melt was prepared at 150°–160° C. by mixing 8.6 g. toluenesulfonamide (a technical grade consisting of the o- and p-isomers), 5.6 g. 2,4-diamino-6-phenyl-s-triazine, 17.8 g. 3-isocyanatomethyl-3,5,5-trimethylcyclohexyl isocyanate, 3.38 g. Brilliant Yellow 6 G, 0.04 g. Rhodamine B, and 0.1 g. Rhodamine 6 GDN (C.I. 45160). The mixture was held at the same temperature for one hour.

Upon cooling, there was obtained a brittle resin fluorescing in an orange-red color and readily capable of being ground (s.p. 170° C.).

EXAMPLE 6

8.6 g. toluenesulfonamide (technical grade), 3.8 g. 2,4-diamino-6-methyl-s-triazine, 17.8 g. 3 - isocyanatomethyl-3,5,5-trimethylcyclohexyl isocyanate, 0.3 g. Brilliant Yellow 6 G, and 0.15 g. Rhodamine 6 GDN were mixed to form a homogeneous melt at 150°–160° C. The condensation reaction started after 4 to 6 minutes, whereby the temperature of the mixture was raised quickly to 200° C. When the temperature started decreasing, the mixture was heated to hold it at 180°–190° C. for another hour, whereupon it was permitted to cool to room temperature.

The resin so obtained was readily ground to a powder and fluoresced with a yellowish orange color (s.p. 207° C.).

EXAMPLE 7

A resin that fluoresced yellow and could be comminuted easily was obtained by the procedure of Example 5 from 8.6 g. toluenesulfonamide (technical grade), 1.3 g. 2,4-diamino - 6 - methyl - s - triazine, 13.3 g. 3-isocyanatomethyl-3,5,5-trimethylcyclohexyl isocyanate, and 0.46 g. Brilliant Yellow 6 G (s.p. 160° C.).

Similarly, a brittle resin fluorescing in a bluish red color was obtained in a reaction period of 75 minutes from 8.6 g. toluenesulfonamide (technical grade), 1.8 g. urea, 17.8 g. 3 - isocyanatomethyl - 3,5,5 - trimethylcyclohexyl isocyanate, and 0.2 g. Sulforhodamine B (C.I. 45100) (s.p. 170° C.).

EXAMPLE 8

A homogeneous melt was formed at 150°–160° C. from 8.6 g. p-toluenesulfonamide, 2.3 g. thiourea, 16.8 g. trimethylhexamethylenediisocyanate, 0.6 g. Brilliant Yellow 6 G, 0.09 g. Rhodamine B, and 0.09 g. Rhodamine 6 GDN. An exothermic reaction started after about 6 to 9 minutes and quickly brought the temperature to 220° C. After the temperature spontaneously fell to 150°–160° C., it was kept at this temperature for 90 minutes.

Upon cooling and solidification, there was obtained a resin which fluoresced with an orange-red color and was readily ground to a powder (s.p. 140° C.).

EXAMPLE 9

15.7 g. benzenesulfonamide, 22.2 g. 3-isocyanatomethyl-3,5,5-trimethylcyclohexyl isocyanate, and 0.3 g. Rhodamine B were heated with stirring to 180°–190° C., whereby a homogeneous melt was obtained. After 6 to 8 minutes, an exothermic reaction started and caused the temperature to rise briefly beyond 210° C., and a temperature of 180°–190° C. was maintained thereafter by heating for 90 minutes.

The resin obtained after cooling and solidification fluoresced red and was easily ground to a powder (s.p. 108° C.).

EXAMPLE 10

7.9 g. benzenesulfonamide, 5.6 g. 2,4-diamino-6-phenyl-s-triazine, 17.8 g. 3-isocyanatomethyl - 3,5,5 - trimethylcyclohexyl isocyanate, and 0.32 g. Brilliant Sulpho Flavine (C.I. 56205) were combined in a homogeneous melt at 180°–190° C. The temperature rose spontaneously to 215° C. after an induction period of 3 to 6 minutes, and mixture was thereafter held at 180°–190° C. for 75 minutes by heating, and solidified by cooling.

The brittle, readily comminuted resin so prepared fluoresced with a yellow color (s.p. 157° C.).

EXAMPLE 11

A resin fluorescing red and readily capable of being ground was obtained by the procedure of Example 5 after a reaction period of 75 minutes from 10.4 g. naphthalene-2-sulfonamide, 5.6 g. 2,4-diamino-6-phenyl-s-triazine, 17.8 g. 3 - isocyanatomethyl - 3,5,5 - trimethylcyclohexyl isocyanate, 0.25 g. Rhodamine B, and 0.25 g. Rhodamine 6 GDN (s.p. 157° C.).

EXAMPLE 12

11.8 g. benzene-1,3-disulfonamide, 11.1 g. 3-isocyanatomethyl-3,5,5-trimethylcyclohexyl isocyanate, and 0.2 g. Rhodamine B were mixed at 180°–190° C. and a homogeneous melt was obtained very slowly. The reaction started only after 20 minutes. A temperature of 180°–190° C. was maintained thereafter for 90 minutes.

The solid resin obtained after cooling was readily ground to a powder and fluoresced with a bluish-red color (s.p. 190° C.).

EXAMPLE 13

The procedure of Example 5 yielded a brittle resin fluorescing with a bluish-red color when applied to a mixture of 8.6 g. toluenesulfonamide (technical grade), 12.6 g. 4,4'-diisocyanato-diphenylmethane, and 0.2 g. Rhodamine B (s.p. 130° C.).

EXAMPLE 14

8.6 g. toluenesulfonamide (technical grade), 20.2 g. 4,4' - diisocyanato-diphenylmethane, and 0.7 g. Brilliant Yellow 6 G were combined into a melt at 150°–160° C. An exothermic reaction started after about 10 to 12 minutes and drove the temperature to 185° C. At this temperature, 5.6 g. 2,4-diamino-6-phenyl-s-triazine was added in small amounts and the reaction was permitted to go to completion within two hours.

The brittle resin obtained upon cooling fluoresced yellow and was readily comminuted (s.p. 205° C.).

EXAMPLE 15

8.6 g. phenylmethanesulfonamide, 5.6 g. 2,4-diamino-6-phenyl-s-triazine, 15.5 g. 3-isocyanatomethyl - 3,5,5-trimethylcyclohexyl isocyanate, and 0.12 g. Rhodamine B were mixed into a homogeneous melt at 150°–160° C. An exothermic reaction starting within 5–8 minutes brought the temperature to 175° C. When the melt again had cooled to 150°–160° C., this temperature was maintained by heating for 90 minutes.

The resin obtained thereafter by cooling to solidification was readily ground and fluoresced with a bluish-red color (s.p. 162° C.).

EXAMPLE 16

A homogeneous liquid was obtained at 150°–160° C. by mixing 9.5 g. methanesulfonamide, 17.8 3-isocyanatomethyl-3,5,5-trimethylcyclohexy isocyanate, and 0.22 g. Rhodamine B. The expected reaction started after about 12 to 16 minutes and the temperature of the mixture briefly exceeded 210° C. As the rate of the reaction decreased, and the temperature dropped, the mixture was held for another hour at 150°–160° C. and thereafter permitted to cool to ambient temperature.

The resin solidified thereby was readily comminuted and fluoresced with a bluish-red color (s.p. 114° C.).

EXAMPLE 17

4.8 g. methanesulfonamide, 5.6 g. 2,4-diamino-6-phenyl-s-triazine, 15.5 g. 3 - isocyanatomethyl-3,5,5-trimethylcyclohexyl isocyanate, 0.52 g. Brilliant Yellow 6 G, 0.03 g. Rhodamine B, and 0.08 g. Rhodamine 6 GDN were converted to a homogeneous melt at 150°–160° C. as in the preceding examples, and the temperature rose spontaneously to 195° C. after an induction period of about 5 to 7 minutes. The reaction was brought to completion at 150°–160° C. in two hours.

The resin so obtained fluoresced with an orange-red color and was easily ground to a powder (s.p. 178° C.).

EXAMPLE 18

8.6 g. toluenesulfonamide (technical grade), 7.2 g. 2,4-diamino - 6 - phenyl-s-triazine, and 13.3 g. 3-isocyanatomethyl - 3,5,5 - trimethylcyclohexyl isocyanate were converted to a colorless resin by the procedure of Example 5, and the resin was ground to a fine powder (s.p. 172° C.).

A 5 g. portion of the powder was suspended in a solution of 10 ml. glacial acetic acid, 1 g. of a commercial non-ionic wetting agent, and 0.2 g. Rhodamine B in 40 ml. water, and the suspension was stirred ten minutes at 40°–50° C. The powder thereafter was filtered off, dried, and again ground. It fluoresced with a bluish-red color.

A similar pigment powder was obtained when a resin was prepared by the procedure of Example 3 from 8.6 g. toluene-sulfonamide (technical grade), 6.3 g. melamine, and 17.7 g. 3-isocyanatomethyl-3,5,5-trimethylcyclohexyl isocyanate, ground, and dyed as described above (s.p. 220° C.).

EXAMPLE 19

A clear liquid was obtained at 120° C. from 7.6 g. propylene glycol, 22.2 g. 3-isocyanatomethyl-3,5,5-trimethylcyclohexyl isocyanate, 0.22 g. Maxilon Brilliant Flavine 10 GFF (C.I. Basic Yellow 40), 0.15 g. Rhodamine B, and 0.13 g. Rhodamine 6 GDN. An exothermic reaction briefly raised the temperature which was thereafter held at 150° C. for about 90 minutes.

The resin obtained after solidification of the reaction mixture fluoresced with an orange-red color and was readily ground to a powder (s.p. 128° C.).

EXAMPLE 20

9.0 g. butyleneglycol, 22.2 g. 3-isocyanatomethyl-3,5,5-trimethylcyclohexyl isocyanate, 0.24 g. Maxilon Brilliant Flavine 10 GFF, 0.16 g. Rhodamine B, and 0.14 g. Rhodamine 6 GDN were combined in a clear solution at 130° C. After 6–8 minutes, a rapid temperature increase and an equally rapid increase in the viscosity of the mixture indicated the start of an exothermic reaction which was maintained by heating for two hours at 150° C.

The resin obtained was similar to that produced in Example 19 (s.p. 161° C.).

A resin fluorescing with a bluish-red color was prepared in an analogous manner from a mixture of 11.7 g. 2-ethyl-1,3-hexanediol, 19.6 g. 3-isocyanatomethyl-3,5,5-trimethylcyclohexyl isocyanate, and 0.45 g. Rhodamine B having an initial temperature of 150° C. (s.p. 118° C.).

EXAMPLE 21

10.4 g. 2,2-dimethyl-1,3-propanediol, 22.2 g. 3-isocyanatomethyl-3,5,5-trimethylcyclohexyl isocyanate, 0.25 g. Maxilon Brilliant Flavine 10 GFF, 0.17 g. Rhodamine B, and 0.15 g. Rhodamine 6 GDN were combined as in Example 20, and a brittle resin fluorescing with an orange-red color was obtained after a reaction of 90 minutes at 150° C. and cooling (s.p. 158° C.).

EXAMPLE 22

9.9 g. 1,4-di-$\beta$-hydroxyethoxy-benzene, 11.1 g. 3-isocyanatomethyl-3,5,5-trimethylcyclohexyl isocyanate, and 0.21 Maxilon Brilliant Flavine 10 GFF were mixed at 150° C. until a clear solution was obtained. A rapid increase of temperature and viscosity after 4–6 minutes indicated the start of a reaction which was maintained at 150° C. for 90 minutes.

The resin which solidified upon cooling of the reaction mixture fluoresced yellow and was easily ground to a fine powder (s.p. 107° C.).

A brittle resin that was readily comminuted and fluoresced with an orange-red color was obtained in the same manner from 15.8 g. bis-hydroxyethyl-Bisphenol-A, 13.1 g. 4,4'-diisocyanatodicyclohexylmethane, 0.22 g. Maxilon Brilliant Flavine 10 GFF, 0.15 g. Rhodamine B, and 0.13 g. Rhodamine 6 GDN (s.p. 143° C.).

EXAMPLE 23

When 12.0 g. 2,2-bis(4-hydroxycyclohexyl)-propane, 10.5 g. trimethylhexamethylene-diisocyanate, 0.17 g. Maxilon Brilliant Flavine 10 GFF, 0.12 g. Rhodamine B, and 0.10 g. Rhodamine 6 GDN were processed as described in Example 22, the resin obtained fluoresced with an orange-red color and was readily ground to a fine powder (s.p. 140° C.).

EXAMPLE 24

3.1 g. ethylene glycol, 6.7 g. trimethylolpropane, 22.2 g. 3-isocyanatomethyl-3,5,5-trimethylcyclohexyl isocyanate, and 0.38 g. Rhodamine B were mixed at 100° C., whereby a clear solution was obtained. The temperature and viscosity of the mixture started rising after 6 to 8 minutes. After the temperature dropped again, and the mixture passed through a brief stage of elastomeric consistency, it was kept for another 90 minutes at 150° C.

The resin obtained after cooling fluoresced with a bluish-red color and was readily ground into a powder (s.p. 267° C.).

EXAMPLE 25

11.2 g. 2,4-diamino-6-phenyl-s-triazine, 5.4 g. 1,4-butanediol, 24.4 g. 3-isocyanatomethyl-3,5,5-trimethylcyclohexyl isocyanate, 0.31 g. Maxilon Brilliant Flavine 10 GFF, 0.21 g. Rhodamine B, and 0.19 g. Rhodamine 6 GDN were mixed at 130° C. The reaction started after 4 to 6 minutes, and a homogeneous melt was obtained. Its temperature and viscosity rose rapidly, and the temperature thereafter dropped. It was held at 150° C. for about 90 minutes.

Upon cooling, thre was obtained a brittle resin which fluoresced with an orange-red color and could readily be ground to a pigment powder (s.p. 178° C.).

A resin fluorescing with a yellowish orange color was obtained in the same manner from 9.4 g. 2,4-diamino-6-phenyl-s-triazine, 6,6 g. 2,2-diethyl-1,3-propanediol, 20.0 g. 3-isocyanatomethyl-3,5,5-trimethylcyclohexyl isocyanate, 0.36 g. Maxilon Brilliant Flavine 10 GFF, and 0.18 g. Rhodamine 6 GDN (s.p. 176° C.).

A yellow fluorescing resin was prepared by the same procedure from a mixture of 9.4 g. 2,4-diamino-6-phenyl-s-triazine, 9.9 g. 1,4-di-$\beta$-hydroxyethoxy-benzene, 20.0 g. 3-isocyanatomethyl-3,5,5-trimethylcyclohexyl isocyanate, and 0.39 g. Maxilon Brilliant Flavine 10 GFF having an initial temperature of 150° C. (s.p. 172° C.).

A closely similar resin resulted from the analogous reaction of 9.4 g. 2,4-diamino-6-phenyl-s-triazine, 2.7 g. pentaerythritol, 17.8 g. 3-isocyanatomethyl-3,5,5-trimethylcyclohexyl isocyanate, and 0.3 g. Maxilon Brilliant Flavine 10 GFF (s.p. 270° C.).

EXAMPLE 26

9.4 g. 2,4-diamino-6-phenyl-s-triazine, 4.5 g. butylene glycol, 18.9 g. trimethylhexamethylenediisocyanate, 0.25 g. Maxilon Brilliant Flavine 10 GFF, 0.17 g. Rhodamine B, and 0.15 g. Rhodamine 6 GDN were mixed at 130° C. as described in Example 25. After the initial reaction subsided, the mixture was held for 90 minutes at 150° C.

The resin obtained was brittle so as to be easily comminuted and fluoresced with an orange-red color (s.p. 147° C.).

In an analogous manner, a bluish-red resin was produced from 9.4 g. 2,4-diamino-6-phenyl-s-triazine, 5.2 g. 2,2-dimethyl-1,3-propanediol, 23.6 g. 4,4'-diisocyanato-dicyclohexylmethane, and 0.58 g. Rhodamine B when the initially molten mixture was kept at 150° C. for two hours after the initial reaction (s.p. 169° C.).

EXAMPLE 27

7.5 g. 2,4-diamino-6-methyl-s-triazine, 5.4 g. 1,4-butanediol, 24.4 g. 3-isocyanatomethyl-3,5,5-trimethylcyclohexyl isocyanate, 0.28 g. Maxilon Brilliant Flavine 10 GFF, 0.19 g. Rhodamine B, and 0.17 g. Rhodamine 6 GDN were mixed at 130° C., whereby a clear solution was obtained. Its temperature and viscosity started rising rapidly after 4 to 6 minutes, and the temperature decreased again thereafter, It was held at 150° C. for 90 minutes more, and then permitted to drop to ambient temperature.

The resin was brittle so as to be ground readily, and fluoresced with an orange-red color (s.p. 169° C.).

A bluish-red fluorescent resin of similar mechanical properties was prepared in the same manner from 6.3 g. 2,4-diamino-6-methyl-s-triazine, 5.2 g. 2,2-dimethyl-1,3-propanediol, 20.0 g. 3-isocyanatomethyl-3,5,5-trimethylcyclohexyl isocyanate, 0.47 g. Rhodamine B, and 0.47 g. Rhodamine 6 GDN (s.p. 197° C.).

EXAMPLE 28

7.6 g. melamine, 5.4 g. 1,4-butanediol, 26.6 g. 3-isocyanatomethyl-3,5,5-trimethylcyclohexyl isocyanate, 0.30 g. Maxilon Brilliant Flavine 10 GFF, 0.20 g. Rhodamine B, and 0.18 g. Rhodamine 6 GDN were mixed at 120° C. The temperature and viscosity of the mixture started increasing after 5 to 7 minutes, and a homogeneous melt was ultimately formed. When the temperature decreased, the mixture was heated to keep it at 150° C. for 90 minutes, and thereafter permitted to cool to ambient temperature.

The solidified resin was readily ground and fluoresced with an orange-red color (s.p. 230° C.).

A similar resin fluorescing with a red color was obtained in the same manner from a starting mixture prepared at 150° C. from 6.5 g. melamine, 4.5 g. butylene glycol, 24.4 g. 3-isocyanatomethyl-3,5,5-trimethylcyclohexyl isocyanate, 0.11 g. Maxilon Brilliant Flavine 10 GFF, and 0.53 g. Rhodamine B. (sp. 248° C.).

A resin fluorescing in a yellowish orange shade was similarly prepared from 6.3 melamine, 4.5 g. 1,4-butanediol, 28.8 g. 4,4'-diisocyanato-dicyclohexylmethane, 0.40 g. Maxilon Brilliant Flavine 10 GFF, and 0.16 g. Rhodamine 6 GDN (s.p. 236° C.).

EXAMPLE 29

A clear solution was prepared at 130° C. by mixing 3.0 g. urea, 7.3 g. 2-ethyl-1,3-hexanediol, 20.0 g. 3-isocyanatomethyl - 3,5,5 - trimethylcyclohexyl isocyanate, 0.23 Maxilon Brilliant Flavine 10 GFF, 0.15 Rhodamine B, and 0.13 g. Rhodamine 6 GDN. Within 3 to 5 minutes, the temperature and viscosity of the mixture started rising gradually. After the temperature passed its maximum value, the mixture was heated to maintain a temperature of 150° C. for 90 minutes, and then permitted to cool.

The resin obtained was brittle so as to be comminuted to a fine powder with little effort, and fluoresced with an orange-red color (s.p. 170° C.).

A similar resin fluorescing with a yellow color was prepared in the same manner from 3.8 g. thiourea, 4.5 g. butylene glycol, 23.6 g. 4,4'-diisocyanato-dicyclohexylmethane, and 0.32 g. Maxilon Brilliant Flavine (s.p. 186° C.).

EXAMPLE 30

5.1 g. toluenesulfonamide (technical grade), 5.6 g. 2,4-diamino-6-phenyl-s-triazine, 3.1 g. ethylene glycol, 17.7 g. 3-isocyanatomethyl - 3,5,5 - trimethylcyclohexyl isocyanate, 0.24 g. Maxilon Brilliant Flavine 10 GFF, 0.16 g. Rhodamine B, and 0.14 g. Rhodamine 6 GDN were mixed at 150° C. An exothermic reaction started within 3 to 5 minutes, and a homogeneous melt was formed after the temperature and viscosity of the mixture rose, and was followed by a temperature decrease. The mixture was kept at 150° C. for 90 minutes by heating, and was then permitted to cool.

The resin was brittle and fluoresced orange-red. It could be ground easily to a powder pigment (s.p. 142° C.).

A similar pigment was produced in the same manner from 5.1 g. toluenesulfonamide (technical grade), 5.6 g. 2,4-diamino-6-phenyl-s-triazine, 4.5 g. 1,4-butanediol, 17.7 g. 3 - isocyanatomethyl-3,5,5-trimethylcyclohexyl isocyanate, 0.25 g. Maxilon Brilliant Flavine 10 GFF, 0.17 g. Rhodamine B, and 0.15 g. Rhodamine 6 GDN (s.p. 130° C.).

EXAMPLE 31

A colorless resin was prepared from 9.0 g. butylene glycol and 22.2 g. 3-isocyanatomethyl-3,5,5-trimethylcyclohexyl isocyanate as described above in Example 20, and ground to a fine powder. A 5 g. portion of the powder was dispersed in a solution of 10 ml. acetic acid, 1 g. non-ionic wetting agent, and 0.2 g. Rhodamine B in 40 ml. water, and the suspension was stirred vigorously at room temperature for 15 minutes. The powder was recovered by filtration, dried, and ground. It fluoresced with a bluish-red color (s.p. 164° C.).

A pigment powder fluorescing with an orange-red color was obtained from a colorless resin prepared from 9.4 g. 2,4-diamino-6-phenyl-s-triazine, 6.6 g. 2,2-diethyl-1,3-propanediol, and 20.0 g. 3-isocyanatomethyl-3,5,5-trimethylcyclohexyl isocyanate, when dyed as above in dilute acetic acid containing 0.15 g. Maxilon Brilliant Flavine 10 GFF, 0.10 Rhodamine B, and 0.10 g. Rhodamine 6 GDN (s.p. 173° C.).

The 46 pigments prepared according to Examples 1 to 31 have softening points ranging from 95° C. to 270° C., and averaging 167° C. By way of comparison, a resin manufactured from toluene sulfonamide, melamine, and formaldehyde and sold on a commercial scale heretofore as a base for fluorescent pigments softens at 105° C. under the same conditions under which the softening points of the resins of the invention were determined. Another resin base for fluorescent pigments was prepared commercially heretofore from toluenesulfonamide, benzoguanamine, and formaldehyde and softened at 115° C. A resin prepared from toluenesulfonamide and formaldehyde alone softens at 45° C.

The resins used heretofore yielded formaldehyde at elevated temperatures such as during grinding, and this is obviously impossible with the resins of the invention which do not contain formaldehyde in releasable form. The resins of the prior art are more readily soluble in solvents such as acetone in which the resins of the invention are either entirely insoluble or only sparingly soluble.

While the invention has been described with particular reference to specific embodiments, it is to be understood that it is not limited thereto, but is to be construed broadly and restricted solely by the scope of the appended claims.

What is claimed is:

1. A fluorescent pigment, the particles of said pigment essentially consisting of a brittle diisocyanate resin and fluorescent coloring matter dispersed in said resin, said resin being the product of a polyaddition reaction between
   (1) an organic isocyanate selected from the group consisting of phenylene diisocyanate, tolylene diisocyanate, naphthylene diisocyanate, bitolylene diisocyanate, diphenylmethane diisocyanate, dimethyldiphenylmethane diisocyanate, tolylene diisocyanate dime, dianisidine diisocyanate, triphenylmethane triisocyanate, isocyanatomethyl-trimethylcyclohexyl isocyanate, diisocyanato-dicyclohexylmethane, hexamethylene diisocyanate, trimethylhexamethylene diisocyanate, and isocyanatophenylethylisocyanate;
   with at least one member of the group consisting of organic sulfonamides and polyols, said isocyanate being an aliphatic or cycloaliphatic isocyanate when said at least one member is a polyol,
   (2) said sulfonamides being members of the group consisting of benzenesulfonamide, toluenesulfonamide, naphthalenesulfonamide, nitrobenzenesulfonamide, chlorobenesulfonamide, sulfanilamide, methanesulfonamide, ethanesulfonamide, phenylmethanesulfonamide, benzenedisulfonamide, and naphthalenedisulfonamide,
   (3) said polyols being members of the group consisting of di-($\omega$-hydroxy-lower-alkoxy)-benzene, compounds of the formula $C_nH_{2n+2-m}(OH)_m$, wherein $n$ is an integer between 2 and 8, and $m$ is an integer between 2 and 4; and compounds of the formula $$HO-X-Y-X-OH$$

wherein X is lower-alkylene-phenylene or cyclohexane, and X is lower alkylidene;
the ratio of said isocyanate and of said at least one member being such that the number of available NCO groups of said isocyanate is between one half the combined number of the available OH and NH groups in said at least one member and a ten percent excess over said combined number.

2. A pigment as set forth in claim 1, further comprising a minor amount of a modifying agent present in said polyaddition reaction and effective for enhancing the hardness and temperature resistance of said pigment, said modifying agent being a compound of the formula

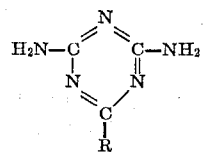

wherein R is hydrogen, alkyl having up to nine carbon atoms, amino, phenyl, benzyl, alkoxy having up to four carbon atoms, alkanoyl having up to ten carbon atoms, phenoxy, or chlorine.

3. A pigment as set forth in claim 1, further comprising a minor amount of a modifying agent present in said polyaddition reaction and effective for enhancing the hardness of temperature resistance of said pigment, said modifying agent being cyanuric acid, urea, thiourea, biuret, dicyanodiamide, or the diamide of malonic, succinic, adipic, or glutaric acid.

4. A pigment as set forth in claim 1, wherein said at least one member is a sulfonamide.

5. A pigment as set forth in claim 1, wherein said at least one member is a polyol.

References Cited
UNITED STATES PATENTS

| | | | |
|---|---|---|---|
| 2,938,873 | 5/1960 | Kazenas | 252—301.2 |
| 3,316,189 | 4/1967 | Adams | 260—37 N |
| 3,454,671 | 7/1969 | Oertel | 260—37 N |

ALLEN B. CURTIS, Primary Examiner

M. L. BELL, Assistant Examiner